United States Patent [19]

Hennicke et al.

[11] 3,795,041

[45] Mar. 5, 1974

[54] PROCESS FOR THE PRODUCTION OF METAL-CERAMIC BOND

[75] Inventors: Hans-Walter Hennicke, Clausthal-Zellerfeld; Hermann-Walter Grunling, Erlangen, both of Germany

[73] Assignee: Siemens Aktiengesellschaft, Berlin, Germany

[22] Filed: Sept. 13, 1971

[21] Appl. No.: 180,090

[30] Foreign Application Priority Data

Sept. 24, 1970 Germany ........................... 2047056

[52] U.S. Cl. .................................. 29/472.9, 29/498

[51] Int. Cl. ............................................ B23k 31/02

[58] Field of Search ...............29/472.9, 498, 473.1; 287/189, 365

[56] References Cited

UNITED STATES PATENTS

| | | | |
|---|---|---|---|
| 2,564,738 | 8/1951 | Tank | 29/472.9 UX |
| 3,324,543 | 6/1967 | McVey et al. | 29/472.9 |
| 3,342,567 | 9/1967 | Dingwoll | 29/472.9 X |
| 3,389,215 | 6/1968 | Rice et al. | 29/472.9 X |
| 3,468,647 | 9/1969 | Buyers et al. | 29/472.9 X |
| 3,517,432 | 6/1970 | Sondstrom | 29/472.9 X |
| 3,531,853 | 10/1970 | Klomp | 29/472.9 |

FOREIGN PATENTS OR APPLICATIONS

| | | | |
|---|---|---|---|
| 1,427,328 | 11/1969 | Germany | 29/472.9 |
| 761,045 | 11/1956 | Great Britain | 29/472.9 |

OTHER PUBLICATIONS

Morris Berg et al., "Ceramic to Aluminum Seal," RCA Technical Notes No. 124, March 12, 1958.

*Primary Examiner*—J. Spencer Overholser
*Assistant Examiner*—Ronald J. Shore
*Attorney, Agent, or Firm*—Herbert L. Lerner

[57] ABSTRACT

A metal ceramic bond wherein the ceramic portion and the metal part, which is alloyed with an active metal in the bonding zone or which contains the bonding zone in the form of an interpolated formed member that is adapted to the bonding surface, is kept below the melting point, in a vacuum, and under pressure of 5 to 50 kp/mm$^2$, for a period up to 25 hours. The metallic bonding zone, preferably, consists of a binary alloy with an active metal content of 0.05 to 15 atom-percent and the ceramic part is preferably sintered corrundum or sapphire ($Al_2O_3$). The base metal used for the binary alloy is copper, silver, nickel or iron. The method may be used advantageously, for example, in the production of electron tubes and semiconductor components.

6 Claims, No Drawings

PROCESS FOR THE PRODUCTION OF METAL-CERAMIC BOND

The invention relates to a method of producing a tightly adhering, ductile and vacuum tight metal ceramic bond by diffusion principle. Metal ceramic bonds are, per se, known. One possibility, for example, is to make the ceramic part, usually sintered corrundum, wettable for solders by applying a metallizing layer and, subsequently, to solder with the metal parts by conventional soft or hard solders. This technique requires a number of work steps for applying the metallization layer, which must be additionally burned in on the ceramic, under defined conditions. Among these techniques are the conventional molybdenum-manganese method, the molybdenum-manganese-silicate method and metallization layers based on tungsten. The disadvantage associated with these methods are the large number of individual working steps and the possibilities of error resulting therefrom.

Another bonding possibility is offered through the active metal technique. This method is based upon the fact that some metals having a high affinity for oxygen can wet the ceramic, alone or alloyed with other metals, at appropriately high temperatures and, in this manner, produce an adhesive bonding between the ceramic and metal. Particularly effective active metals are titanium and zircon. The titanium hydride method constitutes a special technique, according to which titanium hydride is applied upon the location of the ceramic to be bonded and is soldered with conventional solders, at a temperature above the dissociation temperature of the hydride. The titanium dissolves in the solder and the latter becomes wettable for the ceramic. Such soldering was effected in a vacuum or in an oxygen-free atmosphere. The disadvantages associated with this method constitute the possible occurrence, of brittle, intermetallic phases, so that the bonding may become brittle despite satisfactory qualities. The wetting, moreover, is mostly too good, meaning that limiting the solder point may, sometimes, cause great difficulties.

In view of the state of the art and the importance of the metal ceramic bonding, the object of the invention is to provide a bonding method, which does not have the aforementioned shortcomings. In particular, a ductile bonding possibility is provided which makes it possible to accept variable thermal-expansion coefficients of the materials, subsequently to be bonded.

In accordance with the invention, the ceramic portion and the metal part, which is alloyed with an active metal in the bonding zone or which contains the bonding zone in the form of an interpolated formed member that is adapted to the bonding surface, is kept below the melting point, in a vacuum and under pressure of 5 to 50 $kp/mm^2$ for a period up to 25 hours. The metallic bonding zone, preferably, consists of a binary alloy with an active metal content of 0.05 to 15 atom-percent and the ceramic part is preferably sintered corrundum or sapphire ($Al_2O_3$). In view of the required ductility of the bonding, the base metal used for the binary alloy is copper, silver, nickel, or iron. The method may be used, advantageously for example, in the production of electron tubes and semiconductor components.

The invention is based upon the recognition that not just molten metal alloys with specific contents can wet ceramic materials such as, e.g. sintered corrundum or sapphire in so-called active metals and can enter into adhesive compounds with the same, but that wetting and adhesiveness may also be attained at temperatures below the melting point or below the liquids temperature, and even the solid solders temperature, of the alloy. Contrary to the indicated active metal processes, the content of active metal may be very slight, since wetting of the ceramic by the solder is not required, in molten state. This prevents the brittleness which frequently occurs in the active solders; the metal alloys remain ductile. This can also eliminate, with greater facility, tensions which build up in the bonding location through differing heat expansion coefficients, via plastic flow methods.

The surfaces to be bonded must enter into a tight contact with each other. At bonding temperatures, which are below the solidus temperature of the alloy or up to that temperature, that is while the material is still a pure solid body — is best effected by applying a stress within a range of 5 and 50 $kp/mm^2$ depending on the temperature and the alloy employed. Work can be done at bonding temperatures, ranging between the solidus and the liquidus temperatures of the alloy when parts of the alloy are present in a molten state, with low stresses below approximately 20 $kp/mm^2$ or even without any stress. The alloy then has a viscous-type consistency which results from the solid metal remnants that are embedded in a melt or from the small share of a molten phase, contained in a solid structure.

The adhesiveness between the partners is produced via diffusion processes, in the boundary surface. The active components of the alloy reduce the ceramic oxide, the reduction products diffuse from the boundary surface into the metal and the active metal diffuses to the boundary face. In this manner, shearing strengths up to 30 $kp/mm^2$ can be obtained, for example, between $Al_2O_3$ and metals. The adhesive strength determined through pulling tests is depending on the manner of bonding and the employed method is between 4 and 15 $kp/mm^2$. Other tests have also shown that the bonding is high-vacuum tight. Generally, the bonding temperatures are between 750° and 1,400°C and the periods between 5 and 60 minutes.

The active metal contents of the binary alloys are between 0.05 and 15 atom-percent, but no larger than the content which corresponds to the first eutectic on the base metal side of the respective binary system. Preferred are contents between 0.05 and 5 atom-percent. Active metals are those which possess an oxide with a lower formation enthalpy than the respective ceramic oxide or which form solid solutions with oxygen, and act as such. The term "active metal" thus depending on the type of the ceramic oxide being used, sintered corrundum and sapphire ($Al_2O_3$) are of the greatest interest from the technical point of view. The primary active metals in this connection are alkali metal and alkali earth metals, metals of the III, IV and V Secondary Group of the Periodic System of Elements as well as actinide metals such as thorium and uranium, and when a partial oxygen pressure is maintained, in the ambient atmosphere, also chromium. With the exception of the latter, the indicated metals require operation in a vacuum $>10^{-4}$ Torr or in an oxygen free protective gas.

For a further explanation of the invention, are given some embodiment Examples:

1. $\alpha$-$Al_2O_3$/NiTi alloy. A monocrystalline sapphire rod of around 3 mm diameter was provided isostatic at 9,000 atg. (atmospheres gauge) with a 5 mm thick and 7 mm long metal layer of a powder mixture of nickel and titanium hydride, the titanium content being 0.5 atom-percent. The metal layer was applied by sintering, at 1,300°C, for 60 minutes, in a vacuum. The pressure necessary for producing a good bonding was produced by the firing shrinkage, during the sintering of the pressed-on powder. This form of bonding was selected so as to measure the shearing strength, in a simple manner, namely by pressing the sapphire rod out of the wrapping. It amounted to 25 to 32 kp/mm². A similar test with polycrystalline $\alpha$-$Al_2O_3$ resulted in 11 kp/mm²;

2. $\alpha$-$Al_2O_3$/nickel zirconium alloy with 0.2 atom-percent zirconium. The test was carried out exactly as specified under 1. The shearing strengths were around 25 kp/mm² for sapphire; for polycrystalline $Al_2O_3$ 11 kp/mm²;
3. $\alpha$-$Al_2O_3$/NiBe-alloy. The Be-content (alkali earth metal) was at 5 atom percent, the test was carried out as specified under 1. The shearing strength obtained with polycrystalline $Al_2O_3$ (sintered corrundum) was 20 kp/mm²;
4. $\alpha$-$Al_2O_3$/NiTa-alloy. The content of tantalum, an element from the Fifth Secondary group, was 5 atom percent. The test was carried out as under 1. The shearing strength with polycrystalline $Al_2O_3$ (sintered corrundum) was 15 kp/mm²; and
5. $\alpha$-$Al_2O_3$/nickel-chromium alloy with 1 atom-percent chromium. Here, too, the test was carried out as under point 1. The shearing strengths for sapphire were around 20 kp/ mm² for polycrystalline $\alpha$-$Al_2O_3$ at 10 kp/mm².

These examples, as well as a number of further tests, are tabulated in the following:

| Base metal | Alloy addition | Addition (atom-percent) | Shearing strength, kp./mm.² | Temp., ° C. | Time (min.) | Ceramic |
|---|---|---|---|---|---|---|
| Nickel | | | 6 | 1,300 | 60 | Sapphire and sintered corundum. |
| Do | Ti | 0.5 | 25-32 | 1,300 | 60 | Sapphire. |
| Do | Ti | 0.5 | 11 | 1,300 | 60 | Sintered corundum. |
| Do | Zr | 0.2 | 25 | 1,300 | 60 | Sapphire. |
| Do | Zr | 0.2 | 11 | 1,300 | 60 | Sintered corundum |
| Do | Cr | 1 | 20 | 1,300 | 60 | Sapphire. |
| Do | Cr | 1 | 10 | 1,300 | 60 | Sintered corundum. |
| Do | Be | 5 | 20 | 1,300 | 60 | Do. |
| Do | V | 5 | 12 | 1,300 | 60 | Do. |
| Do | Nb | 5 | 18 | 1,300 | 60 | Do. |
| Do | Nb | 1 | 14 | 1,400 | 60 | Do. |
| Do | Ta | 5 | 15 | 1,300 | 60 | Do. |
| Do | Ta | 1 | 14 | 1,400 | 60 | Do. |

For the purpose of measuring the pulling strength, metal plates were placed between sintered corrundum bodies, according to ASTM standard F 19–64. The plate thickness was 0.2 mm and the following results were obtained.

| Base metal | Alloy addition | Addition, atom-percent | Pressure, kp./mm.² | Temp., ° C. | Time | Pulling strength, kp./mm.² |
|---|---|---|---|---|---|---|
| Nickel | Zr | 1 | 25 | 1,200 | 1 h | 4 |
| Do | Ti | 1 | 25 | 1,400 | 1 h | 6 |
| Do | Ti | 5 | 25 | 1,400 | 5 min | 7 |
| Copper | Zr | 1 | 15 | 950 | 1 h | 6 |
| Do | Zr | 3 | 25 | 1,000 | 30 min | 9 |
| Do | Ti | 5 | 25 | 1,000 | 5 min | 6 |

With other mentioned base metals Fe, Ag and Cu similar results can be obtained.

These Examples should be sufficient for elucidating the present invention. Obviously, other material pairing is also possible whose selection depends, for example, on the temperature stress of the bonded work piece and also on the type of metals and ceramic parts which are to be bonded.

We claim:

1. The process of producing a positively adhering, vacuum tight metal ceramic bond between a metallic body and a ceramic body through diffusion in a bonding zone formed between said respective bodies, including the steps of: holding said ceramic body and said metallic body in tight contact; introducing an alloying metal in the form of an active metal into said bonding zone at a temperature below the melting point of an alloy formed therefrom, in an ambient environment selected from the group consisting of vacuum and protective gas atmosphere at a pressure of from 5 to 50 kp/mm² for a period up to 25 hours, thereby causing a reaction with said ceramic body, and effecting bonding between said respective bodies by diffusing the resultant reaction products from said bonding zone into said metallic body and said active metal into said bonding zone and wherein said active metal in said bonding zone consists of a binary alloy with an active metal content of 0.05 to 15 atom percent.

2. The process as claimed in claim 1, wherein: said ceramic body includes: sintered corrundum or sapphire ($Al_2O_3$)

3. The process as claimed in claim 2, wherein: said active metal is selected from alkali metals, alkali earth metals, elements of the III, IV or V secondary group of the Periodic System or actinide metals.

4. The process as claimed in claim 3, wherein: said actinide metal is thorium or uranium.

5. The process as claimed in claim 2, wherein the ambient environment is a protective gas atmosphere and including the step of introducing an active metal in the form of chromium while maintaining oxygen under partial pressure in the ambient atmosphere.

6. The process as claimed in claim 2, wherein: said base metal of the binary alloy is selected from copper, silver, nickel or iron.

* * * * *